July 27, 1937. W. OCHSENBEIN 2,088,138
MACHINE FOR POSTMARKING AND LIKE PURPOSES
Filed May 29, 1936 5 Sheets-Sheet 1
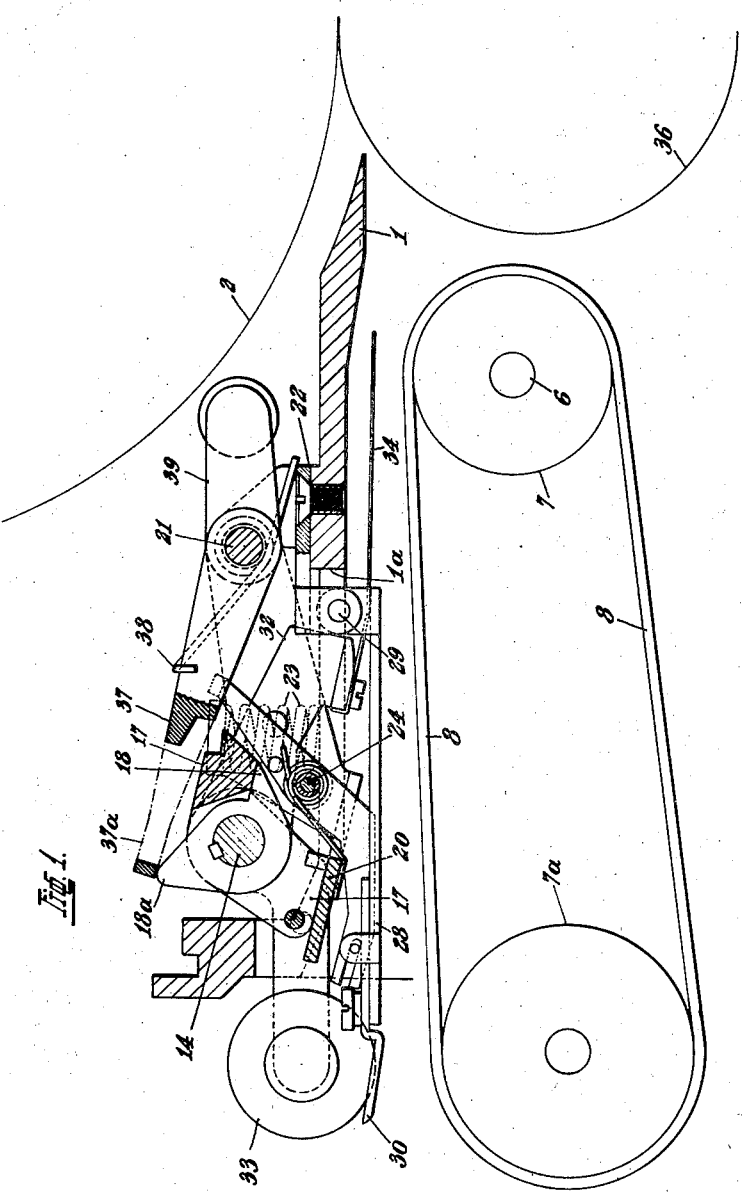
INVENTOR
W. Ochsenbein
BY
ATTORNEY

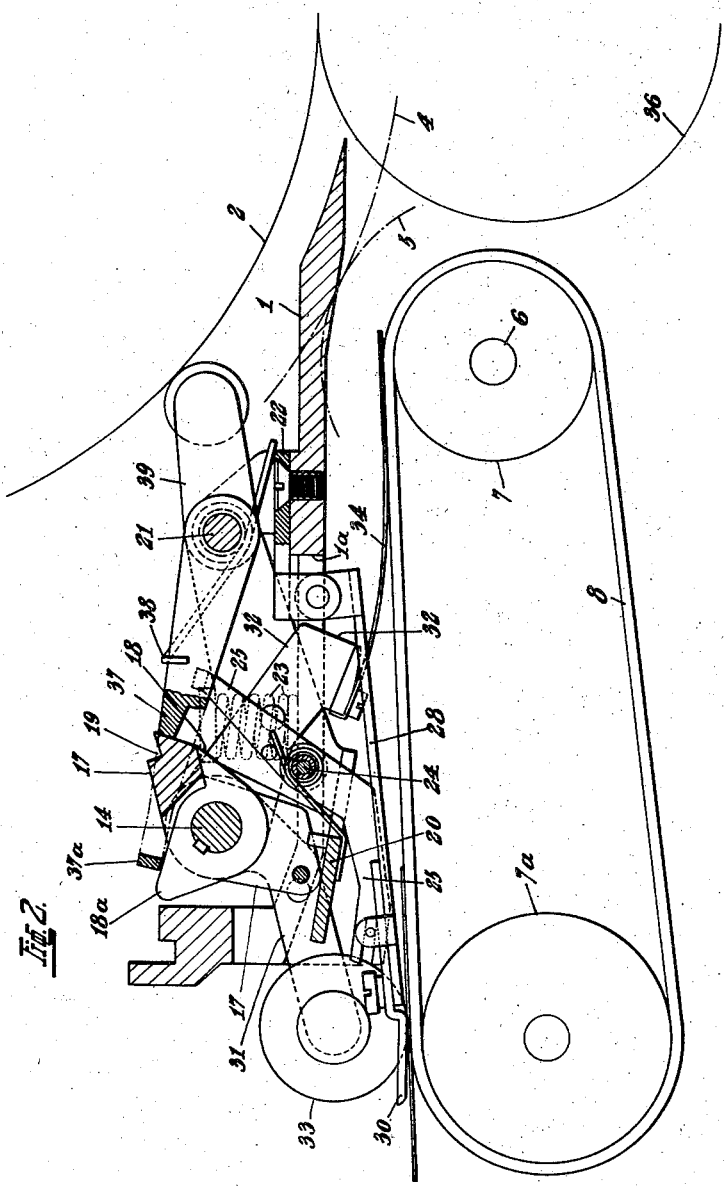
July 27, 1937. W. OCHSENBEIN 2,088,138
MACHINE FOR POSTMARKING AND LIKE PURPOSES
Filed May 29, 1936 5 Sheets-Sheet 2
INVENTOR
W. Ochsenbein
BY
ATTORNEY

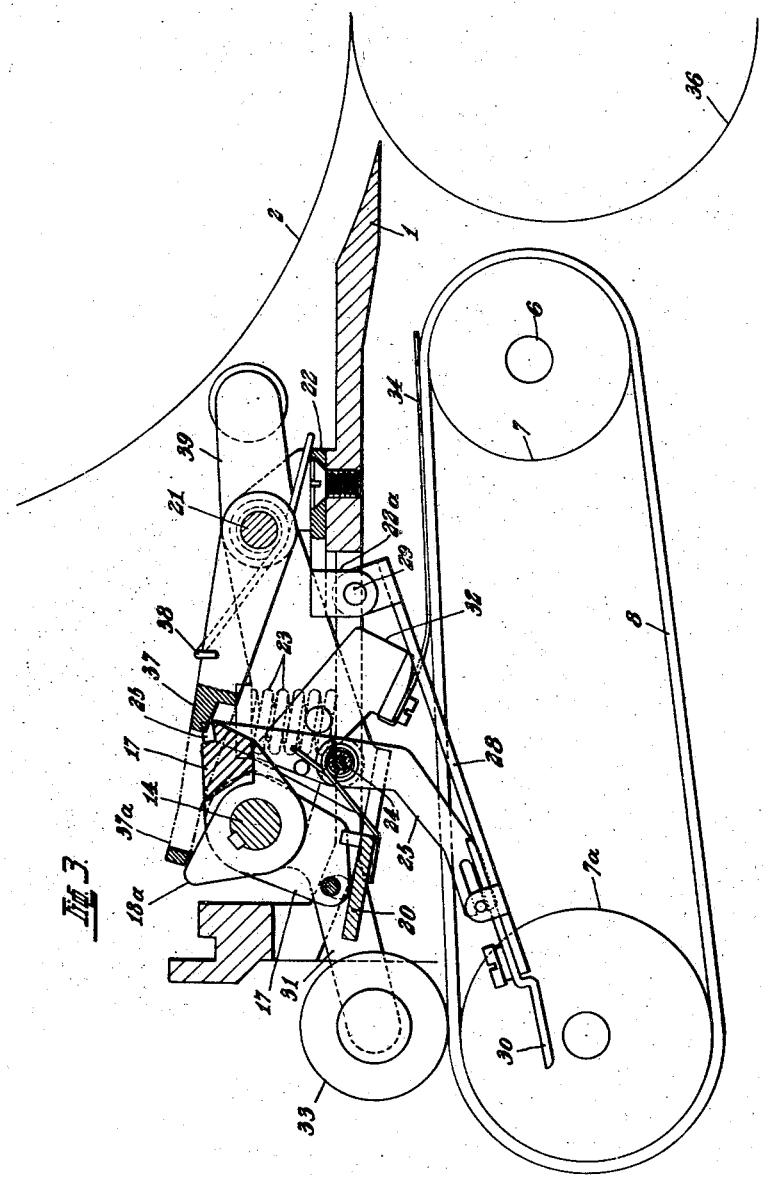

July 27, 1937. W. OCHSENBEIN 2,088,138
MACHINE FOR POSTMARKING AND LIKE PURPOSES
Filed May 29, 1936     5 Sheets-Sheet 4
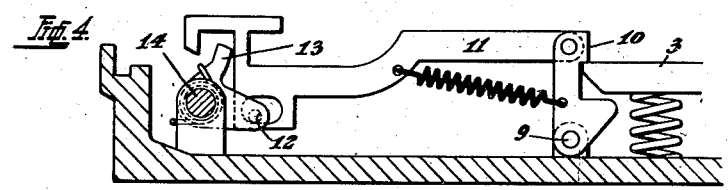
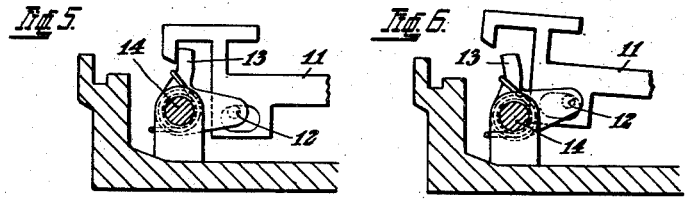
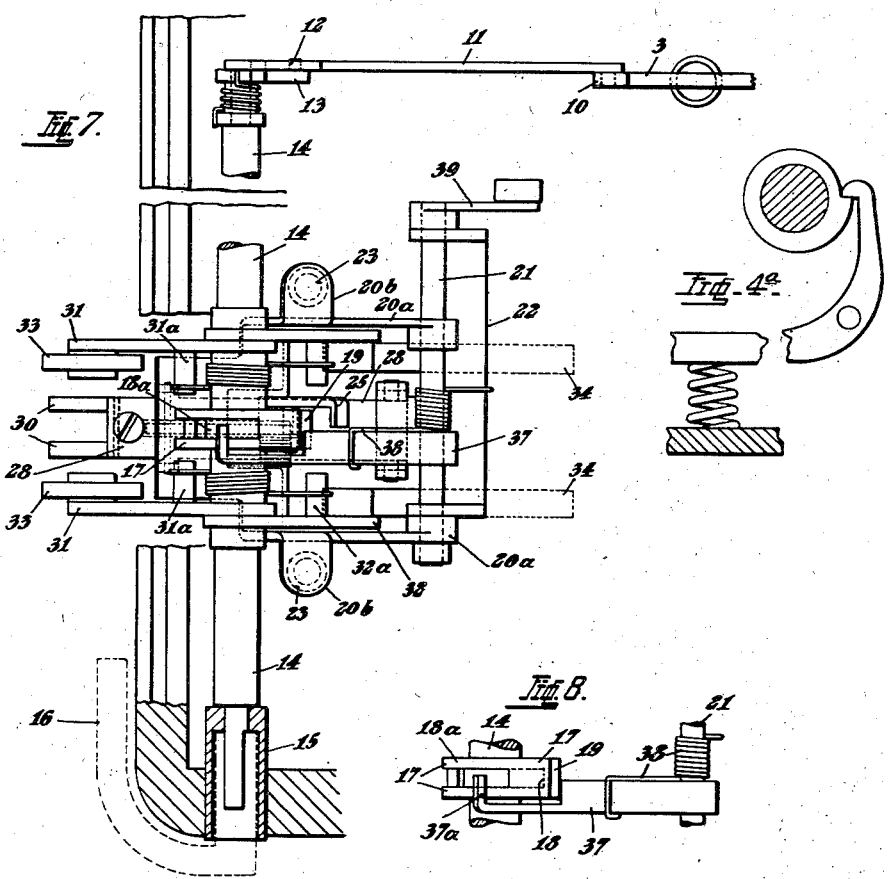
INVENTOR
BY
ATTORNEY July 27, 1937.  W. OCHSENBEIN  2,088,138
MACHINE FOR POSTMARKING AND LIKE PURPOSES
Filed May 29, 1936   5 Sheets-Sheet 5
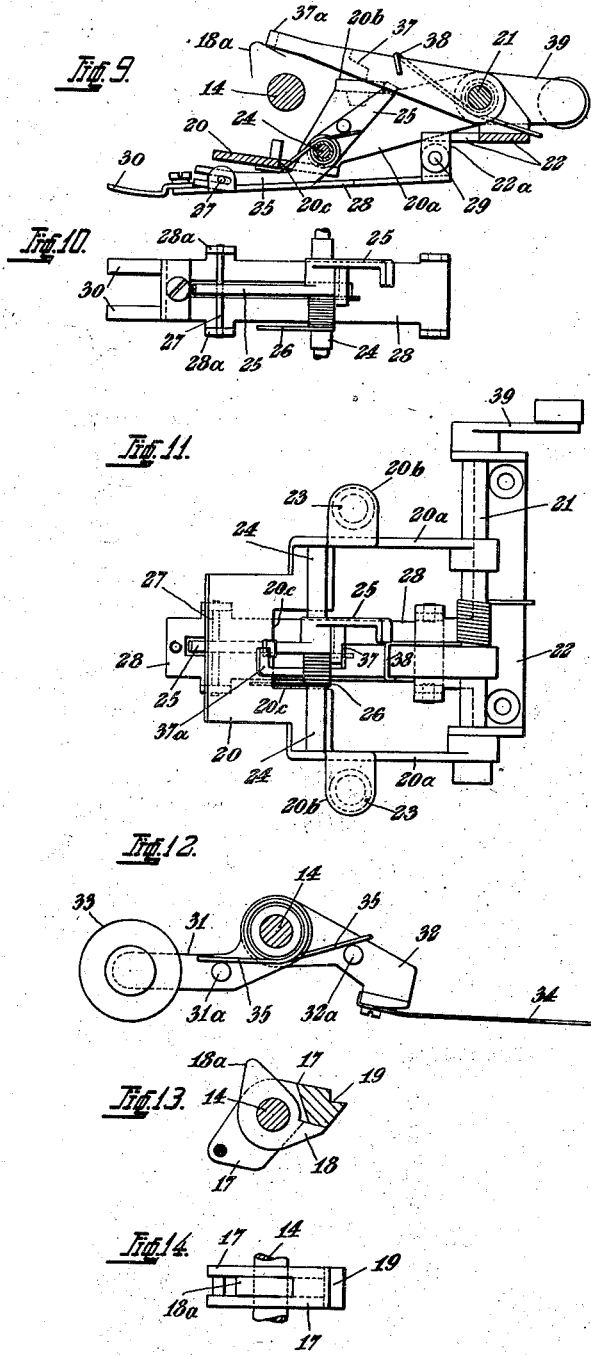
INVENTOR
W. Ochsenbein
BY
E. F. Wendroth
ATTORNEY Patented July 27, 1937

2,088,138

UNITED STATES PATENT OFFICE 2,088,138

MACHINE FOR POSTMARKING AND LIKE PURPOSES

Walter Ochsenbein, Bern, Switzerland, assignor to Hasler A.-G. Werke für Telephonie & Präzisions-mechanik, Bern, Switzerland Application May 29, 1936, Serial No. 82,661
In Switzerland June 21, 1935

10 Claims. (Cl. 101—235)

This invention relates to machines for postmarking and like purposes, that is to say machines for printing or impressing marks or inscriptions on letters, cards or other documents which we shall, for convenience, generally refer to hereinafter as sheets.

The invention is concerned with machines of the kind wherein the impressions are made by means of a rotating cylinder to which the sheets are fed by an endless conveyor, the cylinder and the conveyor having a common drive, and the rotation of the cylinder being stopped automatically on completion of each revolution.

In some machines of this kind there is considerable risk of the sheet being displaced on the conveyor at the time of starting the feed with the result that the mark or impression is frequently not made on the sheet in the correct position.

The object of my invention is to facilitate the adjustment of the sheet on the conveyor, before the feed starts, in such position that when the sheet is delivered to the marking cylinder it will receive the mark on that part of it which is intended to be marked.

For this purpose I arrange above the conveyor a feeler which can be lowered on to a sheet placed on the conveyor, while the latter is stationary, so that accurate marking of the sheet will be secured by adjusting the sheet at the start in a predetermined relation to this feeler, e. g. with the feeler pointing to the part which is to be marked. I may arrange that if the feeler is lowered without first placing a sheet on the conveyor the feeler will drop down beyond its normal operative position and thereby prevent the machine from working.

An example of apparatus according to the invention is shown in the accompanying drawings.

Figs. 1 to 3 are vertical sections, showing the movable parts in three different positions.

Fig. 4 is a vertical section on a larger scale showing the device for unlocking the cylinder.

Fig. 4a shows the operating lever for the device for unlocking the cylinder and cooperating mechanism.

Figs. 5 and 6 are vertical sections to a larger scale showing the device for unlocking the cylinder.

Fig. 7 is a plan view, partly broken away, and

Figs. 8 to 14 show various details of the apparatus.

Within a casing not shown in the drawings there is a table 1, and above the level of this table a marking cylinder 2 is rotatably mounted, the cylinder being driven by means of an electromotor not shown in the drawings, with a clutch which is on completion of each revolution of the cylinder operated by a pawl 3 (Fig. 4) so as to stop the cylinder. The pawl 3 may be in the form of a bell crank lever having a locking projection at one end thereof and a resetting lug near the other end thereof, in a manner similar to the showing of Figures 5 and 6 of my United States Patent No. 1,968,347 granted July 31, 1934.

By means of gears 4 and 5 diagrammatically indicated in Fig. 2 the cylinder drives a shaft 6, on which are two pulleys 7, spaced apart, coacting with pulleys 7a on a parallel shaft to drive two endless conveyor belts 8.

The pawl 3 is spring loaded, and in the position in which it locks the cylinder it is engaged with a latch 10 pivoted at 9 (Fig. 4). A rod 11 is pivoted to this latch and has a slot into which projects a stud 12 on one arm of a bell crank 13 fixed to a shaft 14. The other arm of this lever is adapted to engage a nose at the free end of the rod so that by anti-clockwise rotation of the shaft 14 the rod is moved and disengages the latch from the pawl 3, but the lever has some freedom of movement from the position shown in Fig. 4 before it engages the nose (Fig. 5). After disengagement of the latch from the pawl the stud 12 lifts the rod 11 so as to remove the nose from the path of the upwardly directed lever arm (Fig. 6).

At the end remote from the lever 13 the shaft 14 is mounted in a bearing 15, and its gudgeon in this bearing has a flat enabling it to be engaged with a key lever 16, for rotating the shaft by hand.

A slotted finger 17 rotatably mounted on the shaft 14, and within the slot of this finger a cam 18 (Figs. 13, 14) is fixed to the shaft, so that a tail of the cam rotates the finger when the shaft is rotated anticlockwise. The rotation of the finger causes the same to depress a plate 20 carried by two arms 20a rotatably mounted on a shaft 21, which has bearings in a bracket 22 fixed to the table 1. The arms 20a have lugs 20b resting on coiled springs 23, which press the table upwards against the finger 17.

Above the plate 2 the arms 20a have bearings for a rotatable shaft 24, to which is fixed a double armed lever 25. One arm of this lever extends downwards through a slot 20c in the plate, and below the plate the lever arm is slotted for engagement with a horizontal pin 27 carried by lugs 28a projecting upwards from a lever 28. A spring 26 coiled on the shaft 24 is engaged with the plate 20 and the lever 25, and tends to depress the slotted lever arm.

The lever 28 is flat and broad, and its pivot 29 has bearings in lugs 22a projecting downwards from the bracket 22 through slots 1a in the table 1. This lever is what may be called a feeler, the purpose of which is to bear on the sheet placed on the endless conveyor at the receiving end. Fixed to the free end of the lever is a slotted plate 30 serving as a pointer or gauge, the sheet being placed on the conveyor so that the part to be marked is visible through the slot in the plate 30. This plate is fixed to the lever by means of a readily accessible screw, so that the plate can easily be exchanged for one with a slot of a different size or shape. If desired the outline of the slot may accurately define the portion of the sheet which is to receive the mark.

The upwardly directed arm of the lever 25 is bent aside at the top to engage a notch 19 in the finger 17.

Two pairs of levers 31, 32 are rotatably mounted on the shaft 14. The levers 31 project through an opening in the casing, and outside the casing they carry rollers 33 arranged to rest on the sheet at opposite sides of the plate 30. The levers 32 extend in the opposite direction and carry two weak plate springs 34. Springs 35 are coiled upon the shaft 14, with their ends bearing against studs 31a and 32a projecting from the levers 31 and 32 respectively, so that normally the studs 31a are pressed downwards against the plate 20, and the levers 32 are pressed against the shaft 24.

The rollers 33 and springs 34 act as pressers ensuring that the sheet is held down on the conveyor during the entire feed movement, without relative movement between the sheet and the conveyor, the springs retaining their hold on the sheet till the same is gripped between the marking cylinder 2 and a roller 36 coacting therewith.

A lever 37 is rotatably mounted on the shaft 21, and a spring 38 tends to depress the same so that the cam 18 is in the normal position shown in Fig. 1 a lateral projection 37a of the lever 37 rests upon the nose 18a of the cam. The lever has a recess near its end, and when it is dropped by anticlockwise rotation of the cam (Fig. 2) the upper end of the finger 17 enters this recess and becomes engaged with the lever, so that the finger cannot rock back till the lever 37 is lifted again. The disengagement of the lever 37 can be effected by rotating the key lever 16 clockwise by hand, this being done if from some accidental cause the feed is not proceeding in the proper manner, but in any case the lever 37 is lifted, on completion of the marking operation, by a tappet on the cylinder 2, which strikes a roller carried by an arm 39 fixed to the shaft 21. The key lever 16 is under spring action restoring it to normal position when it is free to rotate clockwise.

The operation of the machine is as follows:

With the parts in the normal position shown in Fig. 1 the rollers 33 and the feeler lever 28 are held clear of the conveyor, as are also the springs 34. The sheet is then placed on the receiving end of the conveyor, with the part to be marked below the slot in the plate 30. Then the lever 16 is rotated by hand so that the finger 17 depresses the plate 20 and causes the levers 28, 31 and 32 to be lowered, thus placing the rollers 33 and the plate 30 on the sheet and laying the springs 34 on the two belts 8. When the cam 18 has effected this the lever 13 disengages the latch 10 from the pawl 3, and rotation of the cylinder 2 begins, accompanied by actuation of the conveyor, which feeds the sheet to the marking cylinder.

If by accident the key lever 16 is actuated without a sheet being placed on the conveyor the lever 28 with the slotted plate 30 drops down between the two belts 8, as shown in Fig. 3. The bent upper arm of the lever 25 then engages the notch 19 in the finger 17 and locks the finger, preventing further rotation of the cam 18 and shaft 14 in the anticlockwise direction, so that the lever 13 does not disengage the latch 10 from the pawl 3.

What I claim as my invention is:

1. In a machine for postmarking and like purposes the combination of a rotatable marking cylinder, a belt conveyor actuated by rotation of said cylinder for feeding sheets to said cylinder, means whereby said cylinder is automatically locked on completion of each revolution, a movable feeler adapted to be lowered on to said conveyor when said conveyor is stationary, for holding the sheet in position on said conveyor, and mechanism for first lowering said feeler and then unlocking said cylinder.

2. In a machine for postmarking and like purposes the combination of a rotatable marking cylinder, a belt conveyor actuated by rotation of said cylinder for feeding sheets to said cylinder, means whereby said cylinder is automatically locked on completion of each revolution, a movable feeler adapted to be lowered on to said conveyor when said conveyor is stationary, for holding the sheet in position on said conveyor, mechanism for first lowering said feeler and then unlocking said cylinder, and means whereby said feeler, when lowered beyond its normal operative position due to absence of a sheet on said conveyor, locks said mechanism so that the unlocking of said cylinder is prevented.

3. In a machine for postmarking and like purposes the combination of a rotatable marking cylinder, a belt conveyor actuated by rotation of said cylinder for feeding sheets to said cylinder, means whereby said cylinder is automatically locked on completion of each revolution, a movable feeler adapted to be lowered on to said conveyor when said conveyor is stationary, for holding the sheet in position on said conveyor, and mechanism for first lowering said feeler and then unlocking said cylinder, said feeler being adapted to serve as a pointer indicating the position which the portion of the sheet which is to be marked should occupy when the feed starts.

4. In a machine for postmarking and like purposes the combination of a rotatable marking cylinder, a belt conveyor actuated by rotation of said cylinder for feeding sheets to said cylinder, means whereby said cylinder is automatically locked on completion of each revolution, a movable feeler adapted to be lowered on to said conveyor when said conveyor is stationary, for holding the sheet in position on said conveyor, and mechanism for first lowering said feeler and then unlocking said cylinder, said feeler having a detachable member adapted to serve as a pointer indicating the position which the portion of the sheet which is to be marked should occupy when the feed starts.

5. In a machine for postmarking and like purposes the combination of a rotatable marking cylinder, a belt conveyor actuated by rotation of said cylinder for feeding sheets to said cylinder, means whereby said cylinder is automatically locked on completion of each revolution, a movable feeler adapted to be lowered on to said conveyor when said conveyor is stationary, for holding the sheet in position on said conveyor, and mechanism for first lowering said feeler and then unlocking said cylinder, said feeler having a slot through which the part of the sheet which is to receive the mark is visible when the sheet is placed in the proper position on said conveyor.

6. In a machine for postmarking and like purposes the combination of a rotatable marking cylinder, a belt conveyor actuated by rotation of said cylinder for feeding sheets to said cylinder, means whereby said cylinder is automatically locked on completion of each revolution, a pivoted feeler above said conveyor, adapted to swing downwards into contact with said conveyor when said conveyor is stationary, for holding a sheet in position on said conveyor, a spring loaded lever tending to swing said feeler downwards, a spring supported member carrying said lever, a rotatable shaft, a cam fixed to said shaft, a finger rotatable on said shaft, adapted to be actuated by said cam and to depress said spring supported member, means restraining said lever from swinging said feeler downwards, adapted to be rendered inoperative by depressing said spring supported member, and means actuatable by said shaft for unlocking said cylinder after depression of said spring supported member.

7. The combination claimed in claim 6, together with means whereby said feeler, when lowered beyond its normal operative position, restrains said shaft from unlocking said cylinder.

8. In a machine for postmarking and like purposes the combination of a rotatable marking cylinder, a belt conveyor actuated by rotation of said cylinder for feeding sheets to said cylinder, means whereby said cylinder is automatically locked on completion of each revolution, a pivoted feeler above said conveyor, adapted to swing downwards into contact with said conveyor when said conveyor is stationary, for holding a sheet in position on said conveyor, a spring loaded lever tending to swing said feeler downwards, a spring supported member carrying said lever, a rotatable shaft, a cam fixed to said shaft, a finger rotatable on said shaft, adapted to be actuated by said cam and to depress said spring supported member, means restraining said lever from swinging said feeler downwards, adapted to be rendered inoperative by depressing said spring supported member, means actuatable by said shaft for unlocking said cylinder after depression of said spring loaded member, and a spring loaded presser adapted to bear on the sheet on said conveyor but normally held clear of said conveyor by said spring supported member.

9. In a machine for postmarking and like purposes the combination of a rotatable marking cylinder, a belt conveyor actuated by rotation of said cylinder for feeding sheets to said cylinder, means whereby said cylinder is automatically locked on completion of each revolution, a pivoted feeler above said conveyor, adapted to swing downwards into contact with said conveyor when said conveyor is stationary, for holding a sheet in position on said conveyor, a spring loaded lever tending to swing said feeler downwards, a spring supported member carrying said lever, a rotatable shaft, a cam fixed to said shaft, a finger rotatable on said shaft, adapted to be actuated by said cam and to depress said spring supported member, means restraining said lever from swinging said feeler downwards, adapted to be rendered inoperative by depressing said spring supported member, means actuatable by said shaft for unlocking said cylinder after depression of said spring supported member, spring loaded levers bearing downwards on said spring supported member, rollers carried by two of said levers, adapted to rest on said conveyor at the receiving end thereof, and plate springs carried by other two of said levers, adapted to bear on said conveyor at the delivery end thereof, said rollers and plate bearing springs being normally held out of contact with said conveyor by said spring supported member.

10. In a machine for postmarking and like purposes the combination of a rotatable marking cylinder, a belt conveyor actuated by rotation of said cylinder for feeding sheets to said cylinder, means whereby said cylinder is automatically locked on completion of each revolution, a pivoted feeler above said conveyor, adapted to swing downwards into contact with said conveyor when the said conveyor is stationary, for holding a sheet in position on said conveyor, a spring loaded lever tending to swing said feeler downwards, a spring supported member carrying said lever, a rotatable shaft, a cam fixed to said shaft, a finger rotatable on said shaft, adapted to be actuated by said cam and to depress said spring supported member, means restraining said lever from swinging said feeler downwards, adapted to be rendered inoperative by depressing said spring supported member, and a lever controlled by said cam, adapted automatically to engage said finger and lock the same against backward rotation when said cam has rotated said finger for depression of said spring supported member.

WALTER OCHSENBEIN.